Oct. 4, 1932.   S. G. BROWN   1,881,350
DYNAMO ELECTRIC MACHINE
Filed June 30, 1930
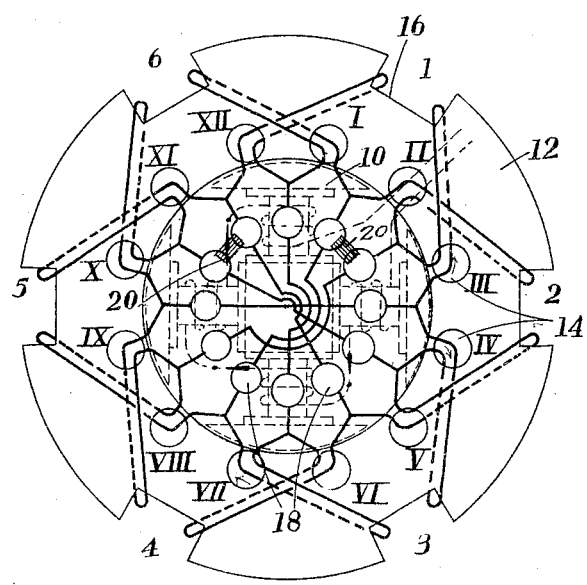
Sidney George Brown, INVENTOR
BY
Thomas Alderman
          ATTORNEY

Patented Oct. 4, 1932

1,881,350

UNITED STATES PATENT OFFICE

SIDNEY GEORGE BROWN, OF NORTH ACTON, LONDON, ENGLAND

DYNAMO ELECTRIC MACHINE

Application filed June 30, 1930, Serial No. 464,965, and in Great Britain August 9, 1929.

This invention relates to electric motors and generators of the kind in which an outer annular member (whether rotor or stator) has a Gramme-ring winding so arranged as to provide regions of alternately opposite polarity spaced around the annular core, and is more particularly concerned with motors of this kind used for rotating the gyro wheels of gyro compasses, turn indicators for aircraft and like apparatus.

It is found that such motors have an appreciable external magnetic field due to the external laps of the windings, sufficient in extent to interfere with the magnetic compass, and it is the object of the present invention to provide a motor of the kind referred to in which the external magnetic field is eliminated or very much reduced in strength.

According to this invention, the coils of the winding are so arranged that external laps in which current is flowing in opposite directions are brought into close proximity. This may conveniently be done, in those cases where the coils are held in slots in the annular core, both internally and externally, by providing half as many external slots as there are internal slots (or some other even fraction), and placing in each external slot the external laps of two coils (or a plurality of pairs of coils) in which current is flowing in opposite directions. By this means it is assured that the magnetic fields of all the external laps neutralize one another, although the interal laps provide alternate regions of opposite polarity.

The accompanying drawing is a diagram of a four-pole external-rotor motor as used for a gyroscopic turn-indicator and wound according to this invention.

The four-pole field stator 10, shown in dotted lines, is wound in the usual way to give opposed north and south poles. The rotor 12 has twelve tunnels 14, numbered I to XII, and six external slots 16, numbered 1 to 6. There are twelve cross-connected commutator-segments 18 each connected to two adjacent rotor coils as usual. The brushes 20 are 90° apart.

Assuming that current enters the rotor windings from the right hand brush, it will be seen that in the position of the brushes shown the coils in tunnels II, V, VIII and XI will be short-circuited by reason of the fact that the brushes bridge across adjacent commutator segments which are cross-connected to the segments diametrically opposite to them. Thus, the outer sides of the coils in the external slots 2 and 5 carry no current. Dealing with the other coils, it will be seen that current will flow away from the observer in the inner sides of the coils in tunnels I, XII, VII, VI and towards the observer in the inner sides of the coils in tunnels III, IV, IX, X. Taking any external slot other than numbers 2 and 5, for example, slot No. 6—it will be seen that this results in the current flowing in opposite directions in the two bundles of wires constituting the outer sides of the two coils in that slot, for one of these outer sides extends to tunnel I and the other one extends to tunnel X, and in these two tunnels the current is flowing in opposite directions as already stated. The same will be found to be true of the remaining slots 1, 3 and 4. There are times when the brushes are not short-circuiting adjacent commutator segments, and at these times the outer sides of all coils are carrying current and the condition of opposite direction of flow holds for all of them.

Each external slot carries the outer sides of two coils the inner sides of which are separated by two others. Thus the coils in tunnels II and V are carried in the slot 2, those in tunnels IV and VII in slot 3, and so on. The outer sides of the two coils in any slot must therefore necessarily carry current flowing in opposite directions, as indicated. Thus it is ensured that in every slot, under all conditions, current is flowing in one direction in as many wires as there are wires with current flowing in the opposite direction, with the result that there is no, or no appreciable, external magnetic field. Any other symmetrical arrangement may be employed so long as the above condition is satisfied. The fields due to the inner sides of the rotor coils and to the stator coils are, of course, shielded by the rotor core.

I claim:—

1. In a dynamo-electric machine, in combination, an internal field magnet, an external annular core and a Gramme-ring winding carried thereby whereof the external laps are grouped in pairs in the members of which current flows in opposite directions.

2. In a dynamo-electric machine, in combination, an internal field magnet, an external annular core and a Gramme-ring winding carried thereby whereof each external lap has in close proximity thereto another external lap in which current flows in the opposite direction and each such pair of external laps is spaced apart from adjacent pairs.

3. In a dynamo-electric machine, in combination, an internal field magnet, an external annular core provided with external slots and a Gramme-ring winding of which the external laps are carried in said slots and each slot carries a lap in which current flows in one direction and a lap in which current flows in the opposite direction.

4. In a dynamo-electric machine, in combination, an internal field magnet, an external annular core provided with external slots and a Gramme-ring winding of which the external laps are carried in said slots and each slot carries a plurality of conductors in which current flows in one direction and the same plurality of conductors in which current flows in the opposite direction.

5. In a dynamo-electric machine, in combination, an internal field magnet, an external annular core provided with a plurality of external slots and a plurality of internal apertures the number of which is an even multiple of the number of external slots, and a Gramme-ring winding carried by said core whereof the outer laps of at least two coils are carried in each external slot and their inner laps are carried respectively in odd- and even-numbered internal apertures.

6. In a dynamo-electric machine, in combination, an internal field magnet an external annular core provided with a plurality of external slots and a plurality of internal apertures the number of which is twice the number of external slots, and a Gramme-ring winding carried by said core whereof the outer laps of two coils are carried in each external slot and their inner laps are carried respectively in two internal apertures separated by two other such apertures.

7. An electric motor comprising in combination an internal field stator, an external annular rotor core provided with a plurality of external slots and a plurality of internal apertures the number of which is twice the number of external slots, and a Gramme-ring winding carried by said core whereof the outer laps of two coils are carried in each external slot and their inner laps are carried respectively in odd- and even-numbered internal apertures.

In witness whereof I hereunto subscribe my name this fifth day of June A. D. 1930.

SIDNEY GEORGE BROWN.